United States Patent [19]
Chang

[11] Patent Number: 5,987,130
[45] Date of Patent: Nov. 16, 1999

[54] SIMIPLIFIED SECURE SWIFT CRYPTOGRAPHIC KEY EXCHANGE

[76] Inventor: Chung Nan Chang, 1455 Wessex Ave., Los Altos, Calif. 95024

[21] Appl. No.: 08/828,703

[22] Filed: Mar. 31, 1997

[51] Int. Cl.$^6$ ............................... H04L 9/00; H04L 9/30
[52] U.S. Cl. ............................... 380/21; 380/28; 380/30; 380/44; 380/49
[58] Field of Search .................... 380/9, 21, 23, 380/25, 28, 30, 44, 45, 46, 47, 49, 50, 59

[56] References Cited

U.S. PATENT DOCUMENTS

| | | |
|---|---|---|
| 3,796,830 | 3/1974 | Smith . |
| 3,798,359 | 3/1974 | Feistel . |
| 3,798,360 | 3/1974 | Feistel . |
| 3,798,605 | 3/1974 | Feistel . |
| 4,200,770 | 4/1980 | Hellman et al. . |
| 4,218,582 | 8/1980 | Hellman et al. . |
| 4,405,829 | 9/1983 | Rivest et al. . |
| 4,424,414 | 1/1984 | Hellman et al. . |
| 4,625,076 | 11/1986 | Okamoto et al. . |
| 4,748,668 | 5/1988 | Shamir et al. ............................. 380/30 |
| 4,850,019 | 7/1989 | Shimizu et al. ........................ 380/29 |
| 4,918,728 | 4/1990 | Matyas et al. ............................. 380/21 |
| 4,944,007 | 7/1990 | Austin ....................................... 380/21 |
| 4,995,082 | 2/1991 | Schnorr ..................................... 380/23 |
| 5,003,596 | 3/1991 | Wood ........................................ 380/28 |
| 5,103,478 | 4/1992 | Matyas et al. ............................. 380/25 |
| 5,142,578 | 8/1992 | Matyas et al. ............................. 380/21 |
| 5,241,599 | 8/1993 | Bellovin et al. .......................... 380/21 |
| 5,265,164 | 11/1993 | Matyas et al. ........................... 380/30 |
| 5,432,849 | 7/1995 | Johnson et al. .......................... 380/21 |
| 5,583,939 | 12/1996 | Chang ...................................... 380/21 |

OTHER PUBLICATIONS

Schneier, Bruce, "Applied Cryptography, Protocols, Algorithms, and Source Code in C," Second Edition, Copyright 1996 by Bruce Schneier, Published by John Wiley & Sons, Inc.

*Primary Examiner*—Bernarr E. Gregory
*Attorney, Agent, or Firm*—Donald E. Schreiber

[57] ABSTRACT

A first of two cryptographic units establish a cryptographic key "K" by initially selecting a first quantity "A", and computes second and third quantities "B"=$\Phi_1(A)$ and "C"=$\Phi_2(A)$. It must be mathematically impossible to compute A from B and the function $\Phi_1$. The first unit then transmits B to the other cryptographic unit, and retains C. The second unit selects a fourth quantity "D" and computes fifth and sixth quantities "E"=$\Phi_3(D)$ and "F"=$\Phi_4(D)$. It must be mathematically impossible to compute D from E and the function $\Phi_3$. Upon receiving B, the second unit uses a fifth mathematical function "$\Psi_2$" to compute the key "K"=$\Psi_2(F, B)$=$\Psi_2(\Phi_4\{D\}, \Phi_1\{A\})$. Analogously, upon receiving E the first unit uses a sixth mathematical function $\Psi_1$ to compute the key "K"=$\Psi_1(C, E)$=$\Psi_1(\Phi_2\{A\}, \Phi_3\{D\})$=$\Psi_2(\Phi_4\{D\}, \Phi_1\{A\})$.

27 Claims, 1 Drawing Sheet ically cryptography and public-key cryptography. In symmetric cryptographic protocols, the same key and cryptographic method are used both for encrypting a plaintext message into cyphertext, and for decrypting a cyphertext to recover the plaintext. It is readily apparent that the security of a symmetric cryptographic protocol can never exceed the security of the single key used both for encryption and decryption.

SIMIPLIFIED SECURE SWIFT CRYPTOGRAPHIC KEY EXCHANGE

BACKGROUND OF THE INVENTION

1. Field of the Invention

The present invention relates generally to cryptography and, more particularly, to the exchanging of cryptographic keys between two cryptographic units.

2. Description of the Prior Art

Two mutually-exclusive classes of cryptographic methods and protocols are well recognized by those familiar with cryptography, symmetric cryptography and public-key cryptography. In symmetric cryptographic protocols, the same key and cryptographic method are used both for encrypting a plaintext message into cyphertext, and for decrypting a cyphertext to recover the plaintext. It is readily apparent that the security of a symmetric cryptographic protocol can never exceed the security of the single key used both for encryption and decryption.

In public-key cryptographic protocols there are two keys, a public key to which anyone can gain access and which is used only for encrypting a plaintext message, and a private key which only the recipient possesses and which is used only for decrypting a cyphertext. For a public-key cryptographic protocol to be secure it must be unfeasible to determine the private key by analyzing the public key. While public-key cryptographic systems appear alluring, thus far in practice it has been observed that public-key cryptographic methods are significantly slower than symmetric cryptographic methods. In general, it has been found that public-key cryptographic methods are 1000 times slower than symmetric cryptographic methods.

Managing the distribution of cryptographic keys is the most difficult security problem in using cryptography both for symmetric protocols and for public-key protocols. Developing secure cryptographic methods and protocols is not easy, but making sure the keys used with such methods and protocols remain secret is an even more difficult task. "Cryptanalysts often attack both symmetric and public-key cryptosystems through their key management." Schneier, *Applied Cryptography,* © 1994 John Wiley & Sons, Inc. ("Schneier") p. 140.

For symmetric cryptographic protocols, there are three well recognized key management problems. First a key may be compromised which permits an eavesdropper who obtains the key either to read all the cyphertext, or even to broadcast bogus cyphertext. The only way to alleviate this problem is to change keys frequently. A second problem for symmetric cryptography key management is that it requires a large number of keys if each pair of individuals in a group is to communicate using a different key. Forty-five unique keys are required if a group of 10 individuals are to communicate. Fifty-five unique keys are required for communication among a group of 11 individuals. The final problem for key management in symmetric cryptographic protocols is that, since keys are more valuable than the encrypted messages, the keys must be exchanged by a secure communication. One approach for securely distributing keys of a symmetric cryptographic protocol is to distribute the keys using a public-key cryptographic protocol.

Whether used with a symmetric cryptographic protocol or with a public-key cryptographic protocol, an encryption key should not be used indefinitely. First, the longer a key is used the more likely it will be compromised by theft, luck, extortion, bribery or cryptanalysis. Long use of a key aids an eavesdropper because that provides more cyphertext encoded with the same key to which cryptoanalytic methods may be applied. Second, on the average the longer a key is used the greater the loss if the key is compromised.

Schneier pp. 376–381 describes various key exchange protocols including:

1. Shamir's Three-Pass protocol;
2. a COMSET protocol; and
3. an Encrypted Key Exchange protocol that may be implemented with various different cryptographic methods such as:
   a. a Rivest, Shamir and Adleman ("RSA") public-key cryptographic method that is described in U.S. Pat. No. 4,405,829;
   b. an ElGamal public-key cryptographic method; and
   c. a Diffie-Hellman public-key cryptographic method that is described in U.S. Pat. No. 4,200,770.

U.S. Pat. Nos. 4,405,829 and 4,200,770 together with Schneier are hereby incorporated by reference.

While all of the preceding protocols provide secure methods for establishing a key, the various protocols require exchanging several, time consuming communications between the parties to establish the key. Moreover, those protocols which require using a public-key cryptographic method also suffer from the slowness of such methods. Moreover, the preceding key exchange protocols are no more secure than the cryptographic method which they employed for key exchange.

Swifter and simpler methods have been developed that are provably secure against all but a brute force cryptanalytic attack. U.S. Pat. No. 5,583,939 ("the '939 patent") describes an exchange protocol in which a sender selects a first and a second quantity, sends one of the quantities to the receiver, e.g. the first quantity, and keeps the other, quantity, e.g. the second quantity, secret. The sender then uses a first function on the selected quantities to compute a third quantity which he also sends to the receiver. After receiving the third quantity, the receiver then selects a fourth secret quantity, and together with the first received quantity, e.g. the first quantity selected by the sender, uses a second function to calculate a fifth quantity which the receiver returns to the sender. Both the sender and the receiver now use a third and fourth function, respectively, to calculate the cryptographic key. The method disclosed in the '939 patent requires that the four functions utilized possess no inverse. That is, the four functions must possess the property that knowing one of the quantities used in calculating a quantity and the quantity thus calculated quantity, it is impossible to compute the other quantity used in performing the calculation. While the method disclosed in the '939 patent is swifter and simpler than previous methods, it requires transmitting at least two quantities from the sender to the receiver.

SUMMARY OF THE INVENTION

An object of the present invention is to provide a cryptographic key exchange protocol which is simpler than present protocols.

Another object of the present invention is to provide a cryptographic key exchange protocol that is faster than present protocols.

Another object of the present invention is to provide an encryption key exchange protocol that is secure against all but a brute force cryptanalysis attack.

Briefly, in the present invention a first of two cryptographic units "T" and "R" wishing to establish a cryptographic key "K" initially selects a first quantity "A". That same unit then uses a first mathematical function "$\Phi_1$" and the selected quantity "A" to compute a second quantity "B"=$\Phi_1$(A). The computed quantity B and the function $\Phi_1$ must posses the property that knowing the computed quantity B, and the function $\Phi_1$, it is mathematically impossible to compute the selected quantity A. That same unit then uses a second mathematical function "$\Phi_2$" and the selected quantity "A" to compute a third quantity "C"=$\Phi_2$(A). The first unit T or R which selected the quantity A then transmits the computed quantity B to the other, second unit R or T, while retaining at the first unit T or R the computed quantity C.

Upon receiving the quantity B transmitted by the first unit T or R, the second unit R or T first selects a fourth quantity "D." Then using a third mathematical function $\Phi_3$ together with the selected quantity D, the second unit T or R computes a fifth quantity "E"=$\Phi_3$(D). The computed quantity E and the function $\Phi_3$ must possess the property that knowing the computed quantity E, and the function $\Phi_3$, it is mathematically impossible to compute the selected quantity D. That same unit then using a fourth mathematical function $\Phi_4$ together with the selected quantity D computes a sixth quantity "F"=$\Phi_4$(D). The second unit R or T which selected the quantity D then transmits the computed quantity E to the other, first unit T or R, while retaining at the second unit R or T the computed quantity F. Then the second unit R or T uses a fifth mathematical function "$\Psi_2$" together with the calculated quantity F and the received quantity B to compute the key "K"=$\Psi_2$(F, B)=$\Psi_2(\Phi_4\{D\}, \Phi_1\{A\})$.

The first unit T or R upon receiving the quantity E transmitted by the unit R or T then uses a sixth mathematical function $\Psi_1$ together with the calculated quantity C and the received quantity E to compute the key "K"=$\Psi_1$(C, E)=$\Psi_1(\Phi_2\{A\},\Phi_3\{D\})=\Psi_2(\Phi_4\{D\},\Phi_1\{A\})$.

An advantage of the present invention is that it is mathematically impossible for an eavesdropper even knowing the computed quantities B and E, and the functions $\Phi_1$, $\Phi_2$, $\Phi_3$, $\Phi_4$, $\Psi_1$ and $\Psi_2$ to directly determine the selected quantities A or D, or the key K because there is no inverse function that may be applied to determine the quantities A or D respectively from the quantities B or E that are readily accessible to the eavesdropper.

These and other features, objects and advantages will be understood or apparent to those of ordinary skill in the art from the following detailed description of the preferred embodiment as illustrated in the drawing figure.

DETAILED DESCRIPTION OF THE PREFERRED EMBODIMENT

Figure 1:
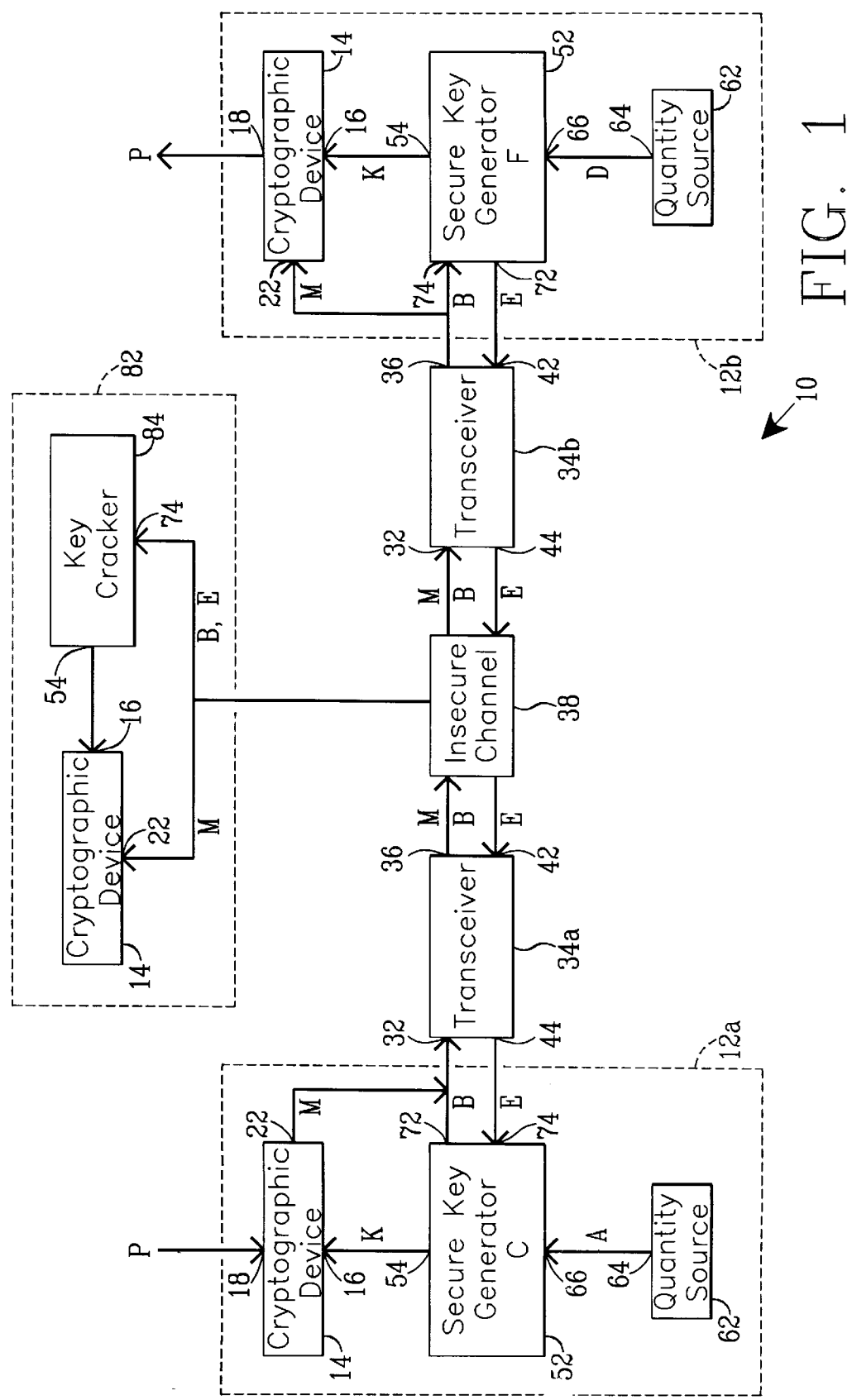
FIG. 1 is a block diagram depicting a cryptographic system which may be employed for secure cryptographic key exchange via an insecure communication channel.

FIG. 1 illustrates a cryptographic system which may be employed for cryptographic key exchange that is referred to by the general reference character 10. The cryptographic system 10 includes a first cryptographic unit 12a enclosed within a dashed line, and a second cryptographic unit 12b also enclosed within a dashed line. Each of the cryptographic units 12a and 12b respectively includes a cryptographic device 14. Each cryptographic device 14 includes a key input port 16, a plaintext port 18, and a cyphertext port 22.

The illustration of FIG. 1 depicts the cyphertext port 22 of the cryptographic device 14 included in the first cryptographic unit 12a as being coupled to a first input port 32 of a first transceiver 34a. Consequently, the cyphertext port 22 may supply a cyphertext message "M" to the first transceiver 34a. The first transceiver 34a also includes a first output port 36 from which the first transceiver 34a transmits the cyphertext message M via an insecure communication channel 38 to a first input port 32 of a second transceiver 34b. The insecure communication channel 38 may include a telephone link, a radio link, a microwave link, a coaxial cable link, a fiber optic link, or any other communication technology that permits transmitting data from a first location to a second location. Thus, for example, while an electronic or optical communication technology is presently preferred for the insecure communication channel 38, the insecure communication channel 38 might also include a messenger service, or a postal service. For a telephonic communication channel 38, the transceivers 34a and 34b might each respectively be conventional modems. Upon receipt of the cyphertext message M at the first input port 32 of the second transceiver 34b, the second transceiver 34b transmits the cyphertext message M from a first output port 36 to the cyphertext port 22 of the cryptographic device 14 included in the second cryptographic unit 12b.

Arranged as described above and as illustrated in FIG. 1, the cryptographic units 12a and 12b provide a cryptographic system 10 in which a plaintext message P may be:

1. presented to the plaintext port 18 of the cryptographic device 14 included in the first cryptographic unit 12a;
2. encrypted by the cryptographic device 14 into the cyphertext message M;
3. transmitted from the cyphertext port 22 of the cryptographic device 14 via:
   a. the first transceiver 34a;
   b. the insecure communication channel 38; and
   c. the second transceiver 34b to the cyphertext port 22 of the cryptographic device 14 of the second cryptographic unit 12b;
4. decrypted by the cryptographic device 14 back into the plaintext message P; and
5. transmitted from the plaintext port 18 of the cryptographic device 14 included in the second cryptographic unit 12b.

Alternatively, though not illustrated in FIG. 1, the cryptographic system 10 could be arranged so the plaintext message P is transmitted as a cyphertext message M from the second cryptographic unit 12b to the first cryptographic unit 12a. To effect such a reverse transmission of the plaintext message P, the cyphertext port 22 of the cryptographic device 14 included in the second cryptographic unit 12b would be coupled to a second input 42 of the second transceiver 34b rather than to its first output port 36. A second output 44 of the second transceiver 34b would then transmit the cyphertext message M via the insecure communication channel 38 to a second input 42 of the first transceiver 34a. A second output 44 of the first transceiver 34a, rather than its first input port 32, would then be coupled to the cyphertext port 22 of the cryptographic device 14 included in the first cryptographic unit 12a. Accordingly, in principle the cryptographic system 10 illustrated in FIG. 1 is capable of being configured for cryptographic transmission of the plaintext message P either from the first cryptographic unit 12a to the second cryptographic unit 12b as depicted in FIG. 1, or from the second cryptographic unit 12b to the first cryptographic unit 12a.

The precise cyphertext message M transmitted between the cryptographic units 12a and 12b depends not only upon the plaintext message P, but also upon a particular cryptographic method employed by the cryptographic device 14 for encryption and/or decryption, and upon a cryptographic key "K" respectively supplied to the key input port 16 of each cryptographic device 14. To supply a cryptographic key K to each cryptographic device 14, both cryptographic units 12a and 12b in accordance with the present invention respectively include a key generator 52 having a key output port 54 from which the key generator 52 transmits the cryptographic key K to the cryptographic device 14.

The cryptographic system 10 depicted in FIG. 1 employs a symmetric cryptographic method for encrypting the plaintext message P, and for decrypting the cyphertext message M. Accordingly, in the illustration of FIG. 1, the cryptographic key K supplied by the key generator 52 to the cryptographic device 14 of the first cryptographic unit 12a is identical to the cryptographic key K supplied by the key generator 52 to the cryptographic device 14 of the second cryptographic unit 12b. Described below is the protocol by which the cryptographic units 12a and 12b may mutually establish a cryptographic key K in accordance with the present invention by exchanging messages between the cryptographic units 12a and 12b via the first transceiver 34a, the insecure communication channel 38 and the second transceiver 34b.

Vector Convolution Cross-Product Protocol

A method for establishing a cryptographic key K in accordance with the present invention employs vector algebra. In a protocol employing vector algebra to establish the cryptographic key K, a quantity source 62, included in the first cryptographic unit 12a, selects a vector "A". To generate the components of the vector A, a random number generator may be used within the quantity source 62, or any of the methods described in Schneier,*Applied Cryptography*, (1994 John Wiley & Sons,Inc) at pp. 140–145 may be employed. The quantity source 62 then transmits the vector A from a quantity output port 64 of the quantity source 62 to a quantity input port 66 of the key generator 52 included in the first cryptographic unit 12a. Upon receiving the vector A with components $(a_0, a_1, \ldots a_{n-1})$ from the quantity source 62, the key generator 52 uses the circulant difference convolution mathematical function of A, namely, $\Delta_- A$ in computing a second vector "B"

$$B = \Delta_- A = (a_0 - a_1, a_1 - a_2, \ldots, a_{n-1} - a_0),$$

In addition the key generator 52 uses the circulant sum convolution function $\Delta_+ A$ in computing a third vector "C"

$$C = \Delta_+ A = (a_0 + a_1, a_1 + a_2, \ldots, a_{n-1} + a_0),$$

After the key generator 52 computes the vectors B and C, it then retains the vector C within the key generator 52 while transmitting the calculated vector B from an output port 72 of the key generator 52 to the first input port 32 of the first transceiver 34a. Upon receiving the vector B, the first transceiver 34a transmits the vector B from its first output port 36, through the insecure communication channel 38 to the first input port 32 of the second transceiver 34b. Upon receiving the vector B, the second transceiver 34b in turn transmits the vector B from its first output port 36 to an input port 74 of a key generator 52 included in the second cryptographic unit 12b.

In addition to receiving the vector B transmitted from the first cryptographic unit 12a, a quantity input port 66 of the key generator 52 included in the second cryptographic unit 12b also receives a vector "D" from a quantity output port 64 of a quantity source 62 included in the second cryptographic unit 12b. The quantity source 62 may generate the vector D using the same method as, or a different method from, that used by the quantity source 62 included in the first cryptographic unit 12a. Upon receiving the vector D with components $(d_0, d_1, \ldots d_{n-1})$, the key generator 52 included in the second cryptographic unit 12b uses the circulant difference convolution function and the vector D in computing a fifth vector "E", $$E = \Delta_- D = (d_0 - d_1, d_1 - d_2, \ldots, d_{n-1} - d_0),$$

In addition the key generator 52 included in the second cryptographic unit 12b uses the circulant sum convolution function $\Delta_+ A$ in computing a sixth vector "F"

$$F = \Delta_+ D = (d_0 + d_1, d_1 + d_2, \ldots, d_{n-1} + d_0),$$

After the key generator 52 computes the vectors E and F, it then retains the vector F within the key generator 52 while transmitting the vector E from an output port 72 of the key generator 52 included in the second cryptographic unit 12b to the second input 42 of the second transceiver 34b. Upon receiving the vector E, the second transceiver 34b transmits the vector E from its second output 44, through the insecure communication channel 38 to the second input 42 of the first transceiver 34a. Upon receiving the vector E, the first transceiver 34a in turn transmits the vector E from its second output 44 to an input port 74 of the key generator 52 included in the first cryptographic unit 12a.

After the key generator 52 included in the second cryptographic unit 12b transmits the vector E to the key generator 52 included in the first cryptographic unit 12a, it then calculates the scalar sum of the components of the vector cross product of F with B to compute the cryptographic key K.

$$K = i \cdot (\Delta_+ D \times \Delta_- A) = \begin{vmatrix} i_0 & i_1 & \ldots & i_{n-1} \\ d_0 + d_1 & d_1 + d_2 & \ldots & d_{n-1} + d_0 \\ a_0 - a_1 & a_1 - a_2 & \ldots & a_{n-1} - a_0 \end{vmatrix}$$

The vector i is the unity vector $i = (1, 1, \ldots, 1)$.

After the key generator 52 included in the first cryptographic unit 12b receives the vector E from the key generator 52 included in the second cryptographic unit 12a, it calculates the scalar sum of the components of the vector cross product of C with E in computing the cryptographic key K.

$$K = i \cdot (\Delta_+ A \times \Delta_- D) = \begin{vmatrix} i_0 & i_1 & \ldots & i_{n-1} \\ a_0 + a_1 & a_1 + a_2 & \ldots & a_{n-1} + a_0 \\ d_0 - d_1 & d_1 - d_2 & \ldots & d_{n-1} - d_0 \end{vmatrix}$$

After computing the cryptographic key K, the key generator 52 included in each of the cryptographic units 12a and 12b transmits the cryptographic key K from its key output port 54 to the key input port 16 of the cryptographic device 14 thereby preparing the cryptographic device 14 either to encrypt the plaintext message P, or to decrypt the cyphertext message M.

Because the cryptographic system 10 includes the insecure communication channel 38, an eavesdropper 82, which is not included in the cryptographic system 10 and which is enclosed within a dashed line in FIG. 1, may receive all of the communications between the first cryptographic unit 12a and the second cryptographic unit 12b.

Accordingly, the eavesdropper 82 receives the vectors A and E and also the cyphertext message M. The eavesdropper 82 also includes a cryptographic device 14 which is functionally identical to, and may in principle be the same as, the cryptographic device 14 included both in the first cryptographic unit 12a and in the second cryptographic unit 12b. Therefore, if the eavesdropper 82 were able to determine the cryptographic key K (e.g. by applying an inverse function to the vectors B and E) and supply the cryptographic key K to a key input port 16 of the cryptographic device 14, the eavesdropper 82 could decrypt the cyphertext message M to read the plaintext message P. Furthermore, if the eavesdropper 82 possess the cryptographic key K the eavesdropper 82 could then also transmit bogus cyphertext message M either to the first cryptographic unit 12a, to the second cryptographic unit 12b, or to both.

Therefore, the eavesdropper 82 also includes a key cracker 84 that is capable of mathematically analyzing the vectors B and E in an attempt to determine the cryptographic key K. However, inverse functions to B and E do not exist since the property of the circulant difference convolution function is that it lacks an inverse function. The lack of an inverse function for the circulant difference convolution function can be seen by expressing $\Delta\_A=B$ in matrix notation.

$$\begin{bmatrix} 1 & -1 & 0 & \ldots & 0 \\ 0 & 1 & -1 & \ldots & 0 \\ \vdots & \vdots & \vdots & & \vdots \\ -1 & 0 & 0 & \ldots & 1 \end{bmatrix} \begin{bmatrix} a_0 \\ a_1 \\ \vdots \\ a_n-1 \end{bmatrix} = \begin{bmatrix} b_0 \\ b_1 \\ \vdots \\ b_n-1 \end{bmatrix}$$

Since the determinant of the square matrix set forth above is zero, the circulant difference convolution function lacks an inverse function. Therefore, knowing the vector B and the circulant difference convolution function, it is impossible to directly compute the vector A.

Although the present invention has been described in terms of the presently preferred embodiment, it is to be understood that such disclosure is purely illustrative and is not to be interpreted as limiting. Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. In a protocol for cryptographic communication via a communication channel "I" in which a transmitting cryptographic unit "T" broadcasts onto the communication channel I an encrypted cyphertext message "M" obtained by supplying both a plaintext message "P" and a cryptographic key "K" to a first cryptographic device, and in which a receiving cryptographic unit "R" receives the broadcast cyphertext message M and by supplying the cyphertext message M together with the key K to a second cryptographic device decrypts the plaintext message P therefrom, a method by which the units T and R mutually establish a cryptographic key K by first exchanging messages before the unit T broadcasts the cyphertext message M comprising the steps of:

a. at a first of the units T or R:
  i. selecting a first quantity "A;"
  ii. using a first algebra A1 and a first mathematical function "$\Phi_1$" on said algebra A1, together with the first quantity A, computing a second quantity "B"= $\Phi_1(A)$; the quantity A, the function $\Phi_1$ and the algebra $A_1$ being such that knowing the quantity B, the function $\Phi_1$ and the algebra A1, there does not exist an inverse function $\Phi_1^{-1}$ of the function $\Phi_1$ that permits directly computing the selected quantity A;
  iii. using said first algebra A1 and a second mathematical function $\Phi_2$ on said algebra A1, together with the first quantity A, computing a third quantity "C"=$\Phi_2$(A);
  iv. transmitting the computed quantity B from the key generator of said first cryptographic unit to the key generator of a second cryptographic unit;
  v. retaining at the first cryptographic unit the computed quantity C;
b. at the second unit R or T:
  i. receiving the quantity B transmitted by the first unit T or R;
  ii. selecting a fourth quantity "D;"
  iii. using a second algebra A2 and a third mathematical function "$\Phi_3$" on said algebra A2 together with a fourth quantity D, computing a fifth quantity "E"= $\Phi_3(D)$, the quantity E, the function $\Phi_3$ and said algebra A2 being such that knowing the quantity E, the function $\Phi_3$ and said algebra A2, there does not exist an inverse function $\Phi_3^{-1}$ of the function $\Phi_3$ that permits directly computing the selected quantity D;
  iv. using said second algebra A2 and a fourth mathematical function "$\Phi_4$" on said algebra A2 together with said quantity D, computing a sixth quantity "F"=$\Phi_4(D)$;
  v. transmitting the computed quantity E from the key generator of said second cryptographic unit to the key generator of said first cryptographic unit;
  vi. retaining at the second cryptographic unit the computed quantity F;
  vii. using a fifth mathematical function "$\Psi_2$" and the calculated quantity F together with the received quantity B to compute the key K=$\Psi_2$(F, B)=$\Psi_2$ ($\Phi_4\{D\}$, $\Phi_1\{A\}$); and
c. at the first unit T or R:
  i. receiving the quantity E transmitted by the unit R or T; and
  ii. using a sixth mathematical function "$\Psi_1$" and the calculated quantity C together with the received quantity E to compute the key K=$\Psi_1$(C, E)=$\Psi_1$ ($\Phi_2\{A\},\Phi_3\{D\}$)=$\Psi_2(\Phi_4\{D\},\Phi_1\{A\})$.

2. The method by which the units T and R mutually establish the cryptographic key K of claim 1 wherein the quantities A and D re respectively selected by a random number generator.

3. The method by which the units T and R mutually establish the cryptographic key K of claim 1 wherein the first cryptographic unit transmits the computed quantity B to the second cryptographic unit via the communication channel I, and the second cryptographic unit transmits the quantity E to the first cryptographic unit via the communication channel I.

4. The method by which the units T and R mutually establish the cryptographic key K of claim 1 wherein the algebra A1 is identical to algebra A2.

5. The method by which the units T and R mutually establish the cryptographic key K of claim 4 wherein the function $\Phi_1$ is identical to function $\Phi_3$.

6. The method by which the units T and R mutually establish the cryptographic key K of claim 5 wherein the function $\Phi_2$ is identical to function $\Phi_4$.

7. The method by which the units T and R mutually establish the cryptographic key K of claim 6 wherein the function $\Psi_1$ is identical to the function $\Psi_2$.

8. The method by which the units T and R mutually establish the cryptographic key K of claim 7 wherein:
   a. the selected quantities A and D are vectors;
   b. the functions $\Phi_1$ and $\Phi_3$ are circulant difference convolution functions of A and D respectively;
   c. the functions $\Phi_2$ and $\Phi_4$ are circulant sum convolution functions of A and D respectively; and
   d. the function $\Psi_1$ is a scalar sum of the components of the vector cross product of C with E, and the function $\Psi_2$ is a scalar sum of the components of the vector cross product of F with B.

9. A cryptographic system adapted for cryptographic communication comprising:
   a. a communication channel "I" adapted for transmission of an encrypted cyphertext message "M;"
   b. a pair of transceivers that are coupled to said communication channel I, and that are adapted for communicating the cyphertext message M from one transceiver to another transceiver via said communication channel I; and
   c. a pair of cryptographic units, each cryptographic unit including:
      i. a quantity source for selecting a quantity to be used in establishing a cryptographic key "K" prior to communicating the cyphertext message M, and for transmitting such selected quantities from a quantity output port of the quantity source;
      ii. a key generator having a quantity input port for accepting the quantity selected by the quantity source, the key generator employing the quantity in establishing a key K which the key generator transmits from a key output port; and
      iii. a cryptographic device having:
         (1) a key input port for receiving the key K from the key generator;
         (2) a plaintext port adapted either for accepting a plaintext message "P" for encryption into a cyphertext message M that is transmitted from the cryptographic device, or for delivering a plaintext message P obtained by decrypting a cyphertext message M received by the cryptographic device; and
         (3) a cyphertext port adapted either for transmitting the cyphertext message M to one of said transceivers, or for receiving the cyphertext message M from such transceiver;
      the key generators of said cryptographic units collaboratively establishing the key K by:
      a. the key generator of a first of the cryptographic units:
         i. using a first algebra A1 and a first mathematical function "$\Phi_1$" on said algebra A1, together with a first quantity "A" that is selected by the quantity source of the first cryptographic unit, computing a second quantity "B"=$\Phi_1$(A); the quantity A, the function $\Phi_1$ and the algebra A1 being such that knowing the quantity B, the function $\Phi_1$ and the algebra A1, there does not exist an inverse function $\Phi_1^{-1}$ of the function $\Phi_1$ that permits directly computing the selected quantity A;
         ii. using said first algebra A1 and a second mathematical function "$\Phi_1$" on said algebra A1, together with the first quantity A, computing a third quantity "C"=$\Phi_2$(A);
         iii. transmitting the computed quantity B from the key generator of said first cryptographic unit to the key generator of a second cryptographic unit;
         iv. retaining at the first cryptographic unit the computed quantity C;
      b. the key generator of said second cryptographic unit:
         i. using a second algebra A2 and a third mathematical function "$\Phi_3$" on said algebra A2 together with a fourth quantity "D," that is selected by the quantity source of said second cryptographic unit, computing a fifth quantity "E"=$\Phi_3$(D), the quantity E, the function $\Phi_3$ and said algebra A2 being such that knowing the quantity E, the function $\Phi_3$ and said algebra A2, there does not exist an inverse function $\Phi_3^{-1}$ of the function $\Phi_3$ that permits directly computing the selected quantity D;
         ii. using said second algebra A2 and a fourth mathematical function "$\Phi_4$" on said algebra A2 together with said quantity D, computing a sixth quantity "F"=$\Phi_4$(D);
         iii. transmitting the computed quantity E from the key generator of said second cryptographic unit to the key generator of said first cryptographic unit;
         iv. retaining at the second cryptographic unit the computed quantity F;
         v. using a fifth mathematical function "$\Psi_2$" and the calculated quantity F together with the received quantity B to compute the key K=$\Psi_2$ (F, B)=$\Psi_2$($\Psi_4${D}, $\Phi_1${A}); and
      c. the key generator of said first cryptographic unit:
         i. receiving the quantity E transmitted from the key generator of said second cryptographic unit;
         ii. using a sixth mathematical function "$\Psi_1$" and the calculated quantity C together with the received quantity E to compute the key K=$\Psi_1$ (C, E)=$\Psi_1$($\Phi_2${A},$\Phi_3${D})=$\Psi_2$($\Phi_4${D}, $\Phi_1${A}).

10. The cryptographic system of claim 9 wherein the quantity source includes a random number generator for selecting the quantities A and D.

11. The cryptographic system of claim 9 wherein the first cryptographic unit transmits the computed quantity B to the second cryptographic unit via the communication channel I, and the second cryptographic unit transmits the quantity E to the first cryptographic unit via the communication channel I.

12. The cryptographic system of claim 9 wherein the algebra A1 is identical to algebra A2.

13. The cryptographic system of claim 12 wherein the function $\Phi_1$ is identical to function $\Phi_3$.

14. The cryptographic system of claim 13 wherein the function $\Phi_2$ is identical to function $\Phi_4$.

15. The cryptographic system of claim 14 wherein the function $\Psi_1$ is identical to the function $\Psi_2$.

16. The cryptographic system of claim 15 wherein:
   a. the selected quantities A and D are vectors;
   b. the functions $\Phi_1$ and $\Phi_3$ are circulant difference convolution functions of A and D respectively;
   c. the functions $\Phi_2$ and $\Phi_4$ are circulant sum convolution functions of A and D respectively; and
   d. the function $\Psi_1$ is a scalar sum of the components of the vector cross product of C with E, and the function $\Psi_2$ is a scalar sum of the components of the vector cross product of F with B.

17. A cryptographic unit adapted for inclusion into a cryptographic system that performs cryptographic communication, the cryptographic system including:

a. a communication channel "I" adapted for transmission of an encrypted cyphertext message "M;" and
b. a pair of transceivers that are coupled to said communication channel I, and that are adapted for communicating the cyphertext message M from one transceiver to another transceiver via said communication channel I, said cryptographic unit comprising:
  a. a quantity source for selecting at least one quantity to be used in establishing a cryptographic key "K" prior to communicating the cyphertext message M, and for transmitting such selected quantities from a quantity output port of the quantity source;
  b. a key generator having a quantity input port for accepting at least one quantity selected by the quantity source, the key generator employing such quantity in establishing the key K which the key generator transmits from a key output port; and
  c. a cryptographic device having:
    i. a key input port for receiving the key K from the key generator;
    ii. a plaintext port adapted either for accepting a plaintext message "P" for encryption into the cyphertext message M and transmission from the cryptographic device, or for delivering a plaintext message P obtained by decryption of the cyphertext message M received by the cryptographic device; and
    iii. a cyphertext port adapted either for transmitting the cyphertext message M to one of the transceivers, or for receiving the cyphertext message M from such transceiver,
  the key generator of said cryptographic unit being adapted for establishing the key K collaboratively by communicating with a second cryptographic unit included in the cryptographic system by:
    a. using a first algebra A1 and a first mathematical function "$\Phi_1$" on said algebra A1, together with a first quantity "A" that is selected by the quantity source of the first cryptographic unit, computing a second quantity "B"=$\Phi_1(A)$; the quantity A, the function $\Phi_1$ and the algebra A1 being such that knowing the quantity B, the function $\Phi_1$ and the algebra A1, there does not exist an inverse function $\Phi_1^{-1}$ of the function $\Phi_1$ that permits directly computing the selected quantity A;
    b. using said first algebra A1 and a second mathematical function "$\Phi_2$" on said algebra A1, together with the first quantity A, computing a third quantity "C"=$\Phi_2(A)$;
    c. transmitting the quantity B from the key generator of said cryptographic unit to the second cryptographic unit;
    d. retaining at the first cryptographic unit the quantity C;
    e. receiving from the second cryptographic unit a fourth quantity "E" that has been obtained using a second algebra A2 in computationally evaluating a third mathematical function "$\Phi_3$" on said algebra A2 together with a fifth quantity "D," that is selected by the quantity source of said second cryptographic unit, to obtain the fourth quantity "E"=$\Phi_3(D)$, the quantity E, the function $\Phi_3$ and said algebra A2 being such that knowing the quantity E, the function $\Phi_3$ and said algebra A2, there does not exist an inverse function $\Phi_3^{-1}$ of the function $\Phi_3$ that permits directly computing the selected quantity D; and
    f. using a fourth mathematical function "$\Psi_1$" and the calculated quantity C together with the received quantity E to compute the key K=$\Psi_1(C, E)$.

18. The cryptographic unit of claim 17 wherein the quantity source includes a random number generator for selecting the quantity A.

19. The cryptographic unit of claim 17 wherein the first cryptographic unit transmits the computed quantity B to the second cryptographic unit via the communication channel I, and receives the quantity E from the second cryptographic unit via the communication channel I.

20. The cryptographic unit of claim 17 wherein the algebra A1 is identical to algebra A2.

21. The cryptographic unit of claim 20 wherein the function $\Phi_1$ is identical to function $\Phi_3$.

22. The cryptographic unit of claim 21 wherein:
  a. the selected quantity A is a vector;
  b. the functions $\Phi_1$ and $\Phi_3$ are circulant difference convolution functions of A and D respectively;
  c. the functions $\Phi_2$ is a circulant sum convolution function of A; and
  d. the function $\Psi_1$ is a scalar sum of the components of the vector cross product of C with E.

23. A key generator adapted for inclusion into a cryptographic unit that is adapted for inclusion into a cryptographic system that performs cryptographic communication, the cryptographic system including:
  a. a communication channel "I" adapted for transmission of an encrypted cyphertext message "M;" and
  b. a pair of transceivers that are coupled to the communication channel I, and that are adapted for communicating the cyphertext message M from one transceiver to another transceiver via the communication channel I, and
  c. a pair of cryptographic units, each cryptographic unit including a cryptographic device having:
    i. a key input port for receiving a cryptographic key "K" prior to communicating the cyphertext message M;
    ii. a plaintext port adapted either for accepting a plaintext message "P" for encryption into the cyphertext message M and transmission from the cryptographic device, or for delivering a plaintext message P obtained by decryption of the cyphertext message M received by the cryptographic device; and
    iii. a cyphertext port adapted either for transmitting the cyphertext message M to one of the transceivers, or for receiving the cyphertext message M from such transceiver,
  the key generator adapted for inclusion into at least one of the cryptographic units comprising:
    a. a quantity input port for accepting at least one quantity to be used by the key generator in establishing the key K;
    b. a key output port from which the key generator transmits the key K to the key input port of the cryptographic device included in the cryptographic unit that includes the key generator;
  the key generator of the cryptographic unit being adapted for establishing the key K collaboratively by communicating with a second cryptographic unit included in the cryptographic system by:
    a. receiving at the quantity input port a first quantity "A;"
    b. using a first algebra A1 and a first mathematical function "$\Phi_1$" on said algebra A1, together with the first quantity A, computing a second quantity "B"=$\Phi_1(A)$;

c. receiving from the second cryptographic unit a third quantity "C" that has been obtained using a second algebra A2 in computationally evaluating a second mathematical function "$\Phi_2$" on said algebra A2 together with a fourth quantity "D," that is selected by a quantity source of said second cryptographic unit, to obtain the third quantity "C"=$\Phi_3$(D), the quantity C, the function $\Phi_2$ and said algebra A2 being such that knowing the quantity C, the function $\Phi_2$ and said algebra A2, there does not exist an inverse function $\Phi_2^{-1}$ of the function $\Phi_2$ that permits directly computing the selected quantity D; and d. using a third mathematical function "$\Psi_1$" and the calculated quantity B together with the received quantity C to compute the key K=$\Psi_1$(B, C).

24. The key generator of claim 23 wherein the cryptographic unit that includes the key generator has a quantity source, and the quantity source of that cryptographic unit includes random number generator for selecting the quantity A.

25. The key generator of claim 23 wherein the key generator receives the quantity C from the second cryptographic unit via the communication channel I.

26. The key generator of claim 23 wherein the algebra A1 is identical to algebra A2.

27. The key generator of claim 23 wherein:
a. the quantities A is a vector;
b. the function $\Phi_1$ is a circulant sum convolution function of A;
c. the function $\Phi_2$ is a circulant difference convolution function of D; and
d. the function $\Psi_1$ is a scalar sum of the components of the vector cross product of B with C.

* * * * *